Oct. 29, 1940.　　　L. F. ATHY ET AL　　　2,219,508
METHOD AND APPARATUS FOR SEISMIC SURVEYING
Filed Aug. 31, 1938　　　3 Sheets-Sheet 1

INVENTORS
Lawrence F. Athy
Elton V. McCollum
BY
Thos. E. Asfield
ATTORNEY

Oct. 29, 1940.  L. F. ATHY ET AL  2,219,508
METHOD AND APPARATUS FOR SEISMIC SURVEYING
Filed Aug. 31, 1938  3 Sheets-Sheet 2

INVENTORS
Lawrence F. Athy
Elton V. McCallum
BY
Thos. E. Defield
ATTORNEY

Oct. 29, 1940.   L. F. ATHY ET AL   2,219,508
METHOD AND APPARATUS FOR SEISMIC SURVEYING
Filed Aug. 31, 1938   3 Sheets-Sheet 3

INVENTORS
Lawrence F. Athy
Elton V. McCollum
BY
ATTORNEY

Patented Oct. 29, 1940

2,219,508

UNITED STATES PATENT OFFICE 2,219,508

METHOD AND APPARATUS FOR SEISMIC SURVEYING

Lawrence F. Athy and Elton V. McCollum, Ponca City, Okla., assignors to Continental Oil Company, Ponca City, Okla., a corporation of Delaware Application August 31, 1938, Serial No. 227,744

14 Claims. (Cl. 181—0.5)

Our invention relates to a method and apparatus for seismic surveying and more particularly to apparatus used in, and the art of seismic surveying by the reflection method.

Various procedures are known for the determination of the slope of sub-surface geological formations by the use of reflected seismic waves. One of the commonest and most useful of these is the so-called "dip shooting" technique. Our invention has to do primarily with a new arrangement of apparatus which brings about an improvement in that technique.

This improvement will be described in more detail by reference to the drawings which are diagrammatic plan views of various set-ups for use in seismic surveying by the reflection method and more particularly in dip shooting. In the drawings.

Figure 1:
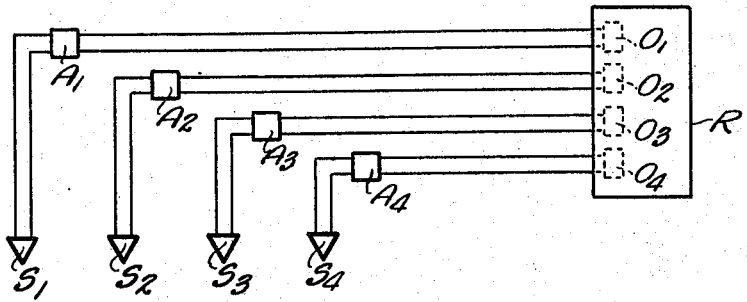
Figure 1 illustrates a common prior art set-up.

Referring more particularly to the drawings, Figure 1 illustrates a common arrangement for use in seismic surveying by the reflection method. A number of seismometers $S_1$, $S_2$, etc. are arranged in line with each other and in line with the shot hole containing an explosive charge E. The detonation of this explosive charge generates seismic waves, some components of which are reflected by sub-surface geological formations. The reflected waves along with other waves are received at the various seismometers and converted into electrical waves thereby. The electrical waves produced by the seismometers are amplified by amplifiers $A_1$, $A_2$, etc., and the amplified waves actuate oscillograph elements $O_1$, $O_2$, etc., in recorder R. The recorder is equipped to photograph all of the oscillograph elements on a moving sensitized strip. Means not shown can be and preferably are provided for recording the instant of the detonation of explosive charge E on the photographic record.

Theoretically a single seismometer could be used instead of a large number of seismometers but in most instances it would be utterly impossible to determine which of the waves received at the seismometer represented reflections. When using a number of seismometers at progressive distances from the point of origin of the seismic waves, the inflections on the various record "traces" due to reflected waves from a single reflecting formation will line up, while the inflections due to other waves will show great deviations in times of arrival at the various seismometers. Thus a comparison of the record traces produced by photographing the various oscillograph elements permits ready identification of the reflected waves. Moreover, it permits a determination of the dip of the sub-surface geological formation causing the particular reflection by measuring the "move out time" or, in other words, the small difference in time required for a wave reflected from the same formation to reach the various seismometers. All this is familiar to those skilled in the art.

Figure 2:
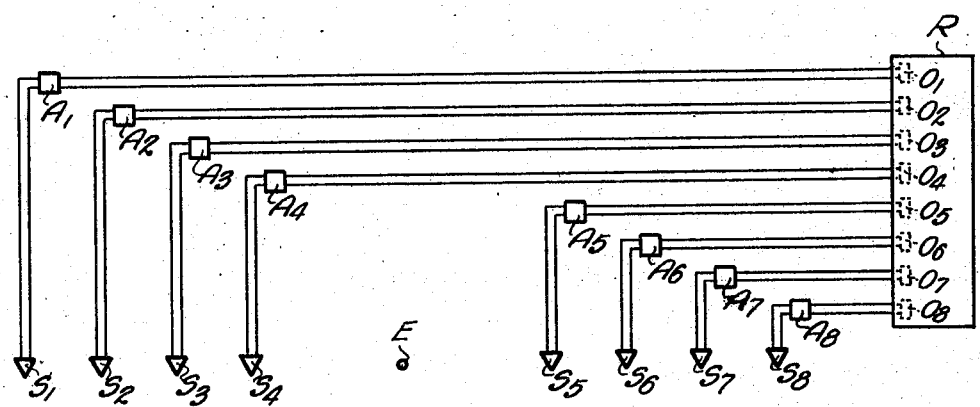
Figure 2 illustrates a modified prior art set-up known as a "split spread"

It is also known to the art to use a so-called "split spread" as illustrated in Figure 2. This is an entirely similar arrangement to that of Figure 1 except that one set of seismometers is arranged up-dip from the shot hole or explosive charge E and another set is arranged down-dip from the shot hole or explosive charge E. Thus in Figure 2 seismometers $S_1$ to $S_4$ extend in one direction from explosive charge E while seismometers $S_5$ to $S_8$ extend in the other direction. As in the case of the set-up of Figure 1, the electrical waves produced by the seismometers are amplified by amplifiers $A_1$ to $A_8$, motivate oscillograph elements $O_1$ to $O_8$ and are recorded on a moving photographic strip in recorder R. This split spread arrangement has several important advantages over the set-up of Figure 1. One of the most important of these is that by making a single record for points both up-dip and down-dip and averaging the results over the whole spread, certain velocity errors cancel out.

However, in order to accomplish this it is necessary to recognize reflections from the same sub-surface formation both in the case of seismometers $S_1$—$S_4$ and in the case of seismometers $S_5$—$S_8$. This is often extremely difficult and sometimes completely impossible since there is necessarily a very considerable gap between the two seismometers nearest the shot hole or, in other words, between seismometers $S_4$ and $S_5$ of Figure 2. Since the distance between these two seismometers is much greater than the distance between other adjacent seismometers the record becomes discontinuous so far as the terrain near the shot hole is concerned and, as previously pointed out, the identification of points of inflection on the record traces representing reflections from a particular formation becomes difficult or impossible.

On the other hand, this difficulty cannot be overcome by merely placing the seismometers of Figure 2 closer to the shot hole since we have found that there is a minimum distance between seismometer and shot hole for satisfactory operation. If a seismometer is placed closer to the shot hole than this minimum distance the surface waves and other relatively direct waves as well as the disturbances due to the tamping liquid blowing out of the shot hole are of such violence as to disturb the delicate equipment in a very serious manner. These violent disturbances prevent the satisfactory recording of the reflected waves.

Thus under most circumstances it will be found necessary to have seismometers $S_4$ and $S_5$ at least about 150 feet apart whereas the interval between seismometers within the groups $S_1$—$S_4$ and $S_5$—$S_8$ may have to be 50 feet or even less in order to do satisfactory geophysical prospecting in certain regions.

It is an object of our invention to overcome the difficulties inherent in the use of a split spread while retaining all of its advantages. Another object is to provide a method for producing a superior record both up-dip and down-dip from a shot point. It is also an object to provide apparatus for use in reflection seismic surveying operations to give a continuous, uninterrupted record. A further object is to provide a reflection seismic surveying method which will simplify the analysis of the record and render that analysis more accurate. Other and more detailed objects will become apparent as the description of our invention proceeds.

Figure 3:
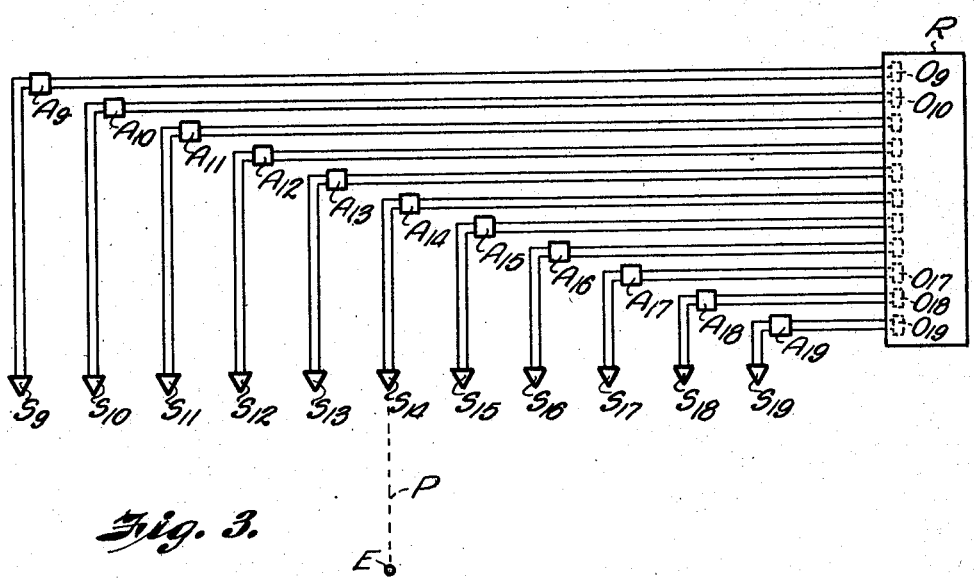
Figure 3 illustrates a so-called "offset spread" set-up in accordance with our invention.
Figure 4:
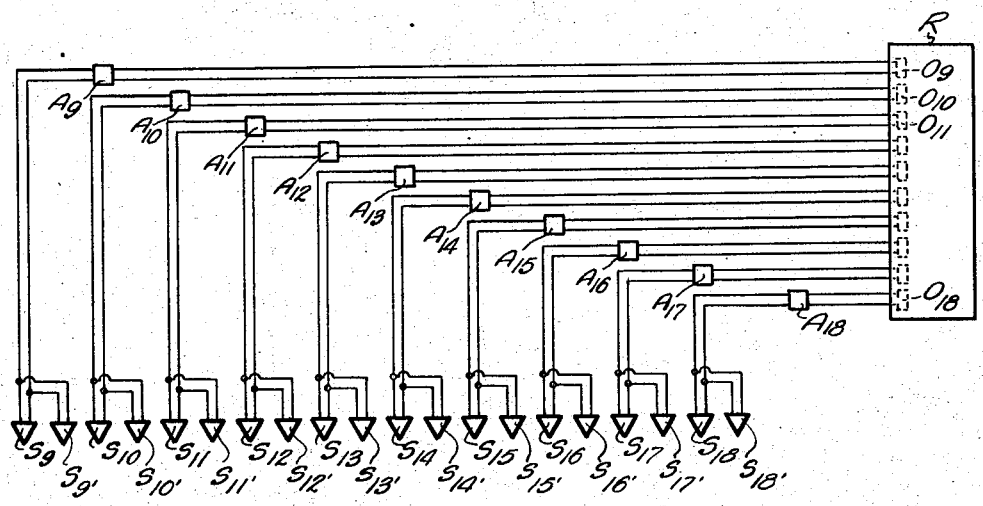
Figure 4 illustrates a set-up similar to that of Figure 3 but utilizing an improved hook-up of seismometers and recording elements.
Figure 5:
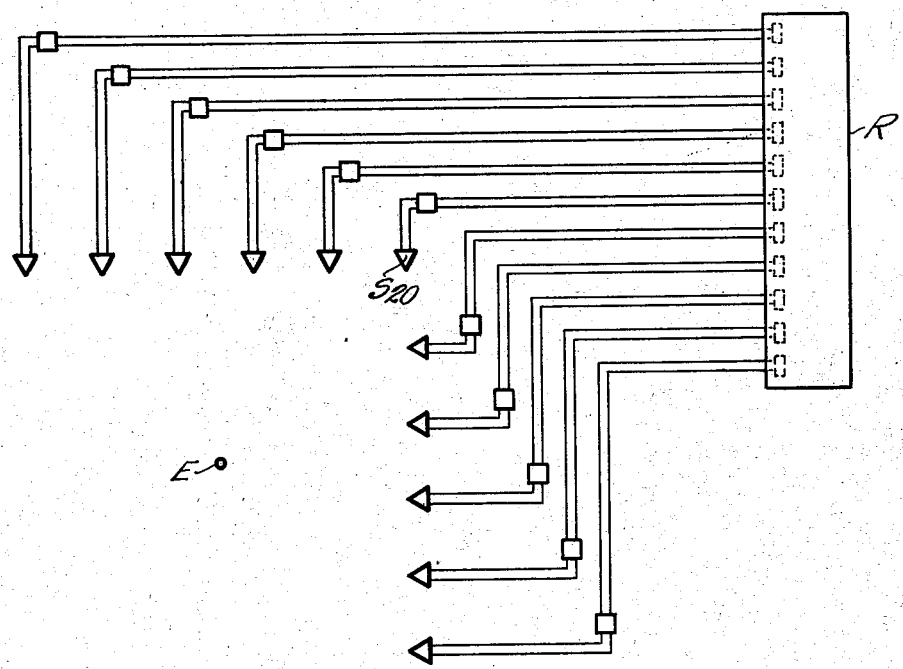
Figure 5 illustrates an offset spread set-up in which the seismometers are arranged on two intersecting lines.

We have overcome the difficulties inherent in the use of a split spread by the use of the offset spread arrangement of Figures 3, 4, and 5. In accordance with this invention the seismometers are placed in line with each other but not in line with the shot hole or explosive charge E. The distance between the line of seismometers and the shot hole is determined so that the distance from the shot hole to the nearest seismometers is at least the minimum for successful and safe recording, i. e., at least about 75 feet. We commonly use a distance from 100 feet to 1000 feet between the shot point and the nearest seismometer and, in some cases, much greater distances are preferable.

As shown in Figure 3, a group of eleven seismometers $S_9$—$S_{19}$ is used. Greater or lesser numbers of seismometers can be used. We prefer to use at least six. Seismometers $S_9$—$S_{12}$ of Figure 3 correspond so far as spacing is concerned to seismometers $S_1$—$S_4$ while seismometers $S_{16}$—$S_{19}$ correspond to seismometers $S_5$—$S_8$ of Figure 2. The offsetting of the seismometers from the shot hole makes feasible the use of three additional intermediate seismometers $S_{13}$—$S_{15}$ and thus makes possible a continuous record. In some cases even more than three additional intermediate seismometers are made possible. The electrical waves produced by the various seismometers are amplified by the amplifying elements of corresponding subscript number and actuate the oscillograph elements of corresponding subscript number.

It is highly desirable, in one of our preferred set-ups, that the arrangement be such that a perpendicular line P from the shot hole to the line of seismometers bisects the line of seismometers. In other words the end seismometers should be substantially equidistant from the shot point since this makes possible the elimination of velocity corrections and permits an accurate, direct determination of dip. This line P, or the horizontal distance from the shot hole to the nearest seismometer may suitably be from about 75 to about 1000 feet in length, it being understood that, under certain conditions, distances up to 3000 feet or more are advantageous. Under most circumstances we find it desirable to operate with the shot hole about 200 feet from the line of seismometers since this distance is sufficient to give good recording on the center seismometers and permits the ready identification of reflected waves. The spacing between adjacent seismometers will depend on local conditions but may suitably be from about 25 feet to about 75 feet. Even smaller spacings can be used. It will be noted that the horizontal offset of the explosive charge from the line of seismometers is substantially greater than the spacing between seismometers, in fact it is usually at least twice as great.

The seismometers need not be on a straight line so long as the end seismometers are equidistant from the shot point, a continuous uninterrupted chain of seismometers is located between the end seismometers, and the minimum and maximum distances between the shot hole and the nearest seismometer are preserved in accordance with principles previously discussed. However, the straight line arrangement is by far the best since it is the most economical and permits the most ready and accurate identification of reflected waves.

We may, if desired, instead of using one seismometer for each oscillograph trace on the record, record the output of several seismometers on each trace. This is often advantageous. For example, forty seismometers may be recorded on ten traces, employing four seismometers to each trace. This enables us to use a greater number of seismometers and to make a longer spread between extreme instruments without the addition of other recording equipment than seismometers. It enables us too, to provide a closer spacing of seismometers without, at the same time, sacrificing length in the overall spread. It will be understood, therefore, that, throughout these specifications, whenever we mention a single seismometer, it may be considered that we may employ a plurality of seismometers electrically connected to a common oscillograph. This is illustrated in Figure 4.

Our offset spread idea can also be applied to shooting along two intersecting lines. Thus, as shown in Figure 5, seismometers can be arranged in two offset lines at right angles to each other, the two lines preferably meeting in a common corner seismometer $S_{20}$. This arrangement is of advantage in cases where there is a sudden change in slope of the sub-surface formation being measured. Determinations along two lines permit the identification of the two slopes.

With the exception of seismometer $S_{20}$ the various seismometers, amplifiers and oscillograph elements of Figure 5 have not been numbered since to do so would serve no useful purpose.

It is advantageous to use a common corner seismometer $S_{20}$ and a single record for both lines of seismometers since this permits the identification of the same reflection for both lines of seismometers. The shot hole should be located on the intersection of the perpendicular bisectors of the two lines of seismometers. The seismometers and the shot hole should be in offset relationship in accordance with principles hereinbefore set forth.

Figure 6:
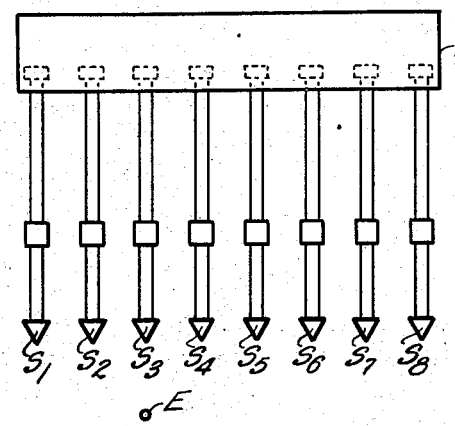
Figure 6 illustrates one type of asymmetrical spread which may be used in accordance with our invention.

Under certain operating conditions, it is found advantageous to employ asymmetrical spreads because of terrain, property lines, roads, and other obstructions. One type of asymmetrical spread is illustrated in Figure 6. This arrangement is similar to Figure 3, except that the perpendicular line from the shot point to the line of seismometers does not bisect the line of seismometers.

Figure 7:
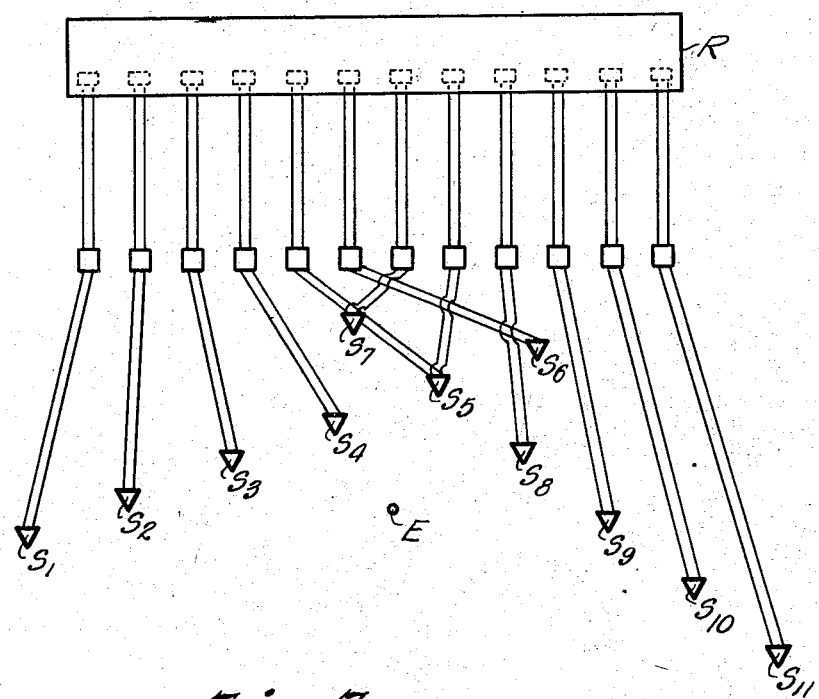
Figure 7 illustrates a dual, asymmetrical, offset spread on two intersecting lines not at right angles to each other.

In Figure 7, our offset spread is adapted to two intersecting lines not at right angles to each other. It will be observed that this is a dual asymmetrical spread. Seismometer 5 is common to both lines of seismometers, but it is not necessary in the execution of our method to have a common seismometer. Neither is it necessary for the lines of seismometers themselves to intersect. It is merely necessary that a projection of one of the lines of seismometers intersects the other line of seismometers or a projection thereof. In true dip shooting, that is, dip shooting to determine two dip components, the lines should intersect preferably at right angles.

In all of the various arrangements of seismometers with respect to shot hole employed in our invention, it is possible to make the weathering corrections by recording the first arrival time of the refracted wave which travels from the shot point to the seismometers along shallow, high speed beds and, from these travel times or differences of travel times, to calculate the necessary corrections. In case of a symmetrical spread in which the end seismometers are equally distant from the shot point, the difference in the first arrival times of the refracted wave at these end seismometers is the weathering time correction. In the case of asymmetrical spreads, the difference in arrival times of the refracted wave can be calculated by the right angle law, assuming only weathering differences at various seismometers. Then any variation in arrival times of the refracted wave from the calculated differences is the weathering correction. In other words, the first arrival times are directly proportional to the distance between shot point and seismometers, and any variation therefrom is due to differences in weathering time.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim:

1. Apparatus for reflection seismic surveying comprising means for generating seismic waves, a large number of seismometers arranged in line with each other, said line being horizontally offset from the position of said generating means by a distance of from about 75 feet to about 1000 feet, and extending in each of two directions from a point opposite said generating means, the end seismometers being substantially equidistant from said generating means, and means responsive to the reflected seismic waves received by the various seismometers for forming a record comprising a plurality of traces.

2. Apparatus for seismic surveying by the reflection method comprising means for generating seismic waves, a large number of spaced seismometers arranged in a substantially straight line, said straight line being horizontally offset from the position of said generating means by a distance not more than about 1000 feet and extending a substantially equal distance in each of two directions from a perpendicular line drawn from said generating means to said line of seismometers and means for recording, as a series of comparative indicia, the responses of said seismometers to said seismic waves.

3. Apparatus for reflection seismic surveying comprising means for generating seismic waves, a large number of spaced seismometers arranged in a substantially straight line, said straight line being horizontally offset from the position of said generating means by a distance at least twice the distance between adjacent seismometers but not more than 1000 feet, and means for forming a single comparative record corresponding to the reflected seismic waves received by the various seismometers.

4. Apparatus according to claim 3 in which said adjacent seismometers are spaced from about 25 feet to about 75 feet apart.

5. Apparatus according to claim 3 in which a perpendicular line drawn from the position of said generating means to said line of seismometers is from about 100 feet to about 300 feet in length.

6. Apparatus for reflection seismic surveying comprising means for generating seismic waves, at least six substantially uniformly spaced seismometers arranged in a line horizontally offset from said generating means by a distance of from about 75 feet to about 1000 feet, and means responsive to the reflected seismic waves received by the various seismometers for forming a plurality of record traces on a single record, said record traces indicating progressively and comparatively the characteristics of reflected seismic waves received along said line of seismometers.

7. Apparatus for reflection seismic surveying comprising means for generating seismic waves, two end seismometers located substantially equidistant from said generating means, a large number of approximately equally spaced seismometers forming a continuous, uninterrupted chain between said end seismometers, said generating means being horizontally offset from a line drawn through the various seismometers, the distance from said generating means to the nearest seismometer being at least about twice the spacing between adjacent seismometers but not more than about 1000 feet, and means responsive to the reflected seismic waves received by the various seismometers for forming a plurality of record traces on a single record, said record traces indicating progressively and comparatively the characteristics of reflected seismic waves received along said line of seismometers.

8. Equipment set-up for reflection seismic surveying comprising an explosive charge disposed in a shot hole for generating seismic waves, at least six seismometers, substantially uniformly spaced, arranged in a substantially straight line horizontally offset from said shot hole by a distance at least twice the distance between spaced seismometers but not more than about 1000 feet, said line of seismometers, extending in each of two directions from a point opposite said shot hole, and means responsive to the reflected seismic waves received by the various seismometers for forming a plurality of record traces on a single record, said record traces indicating progressively and comparatively the characteristics of reflected seismic waves received along said line of seismometers.

9. Apparatus for reflection seismic surveying comprising means for generating seismic waves, a plurality of seismometers arranged in line with each other, a second plurality of seismometers arranged in line with each other, said two lines intersecting at approximately right angles, said generating means being located within the angle formed by said two lines in horizontally offset position to each of said two lines, the offset distance being not more than about 1000 feet, a plurality of recorder elements, and means for actuating each of said recorder elements separately by at least one of said seismometers, whereby a record of the progressive variations in reflected seismic waves received by the various seismometers is obtained.

10. Apparatus for reflection seismic surveying comprising means for generating seismic waves, a plurality of seismometers arranged in line with each other, a second plurality of seismometers arranged in line with each other, said generating means being located substantially at the intersection of the perpendicular bisectors of the two lines of seismometers and not more than about 1000 feet from either line of seismometers, a plurality of recorder elements, and means for actuating each of said recorder elements separately by at least one of said seismometers, whereby a record of the progressive variations in reflected seismic waves received by the various seismometers is obtained.

11. A method of seismic surveying, including the steps of generating seismic waves at a point at or near the earth's surface, receiving reflections of said waves from buried geological strata at a large number of spaced points arranged in a line offset from the position of said seismic wave generation point and extending in both directions from a line perpendicular to said line of said seismic wave receiving points, and recording the received seismic waves.

12. A method of making geophysical explorations including the steps of generating seismic waves at a point at or near the surface of the earth, receiving reflections of said seismic waves from buried geological strata at a large number of points arranged in line with each other, said line being offset from the position of said seismic wave generation point, and recording the received seismic waves.

13. A method of making geophysical explorations including the steps of creating seismic waves at a point at or near the earth's surface, receiving seismic waves reflected from buried geological strata at a large number of points at or near the earth's surface, said points arranged in two nonparallel lines each offset from said seismic wave generation point.

14. A method of making geophysical explorations including the steps of creating seismic waves at a point at or near the earth's surface, receiving seismic waves reflected from buried geological strata at a large number of points at or near the earth's surface, said points arranged in two nonparallel lines each offset from said seismic wave generation point and extending in both directions from respective lines passing from said wave generation point perpendicular to respective lines of seismic wave receiving points.

LAWRENCE F. ATHY.
ELTON V. McCOLLUM.